United States Patent [19]

Wurzburg et al.

[11] Patent Number: 4,593,389
[45] Date of Patent: Jun. 3, 1986

[54] SIMULTANEOUS VOICE AND ASYNCHRONOUS DATA TELEPHONE

[76] Inventors: Henry Wurzburg, 12506 Wistful Cove, Round Rock, Tex. 78664; Stephen H. Kelley, 9226 Knoll Crest Loop, Austin, Tex. 78759

[21] Appl. No.: 625,871

[22] Filed: Jun. 28, 1984

[51] Int. Cl.$^4$ .............................................. H04J 3/12
[52] U.S. Cl. .............................. 370/110.1; 179/2 DP
[58] Field of Search ................... 370/110.1; 179/2 DP

[56] References Cited

U.S. PATENT DOCUMENTS

| 3,459,895 | 8/1969 | Ebhardt | 179/170 J |
| 4,171,467 | 10/1979 | Evenchik | 370/29 |
| 4,253,131 | 2/1981 | Bosik et al. | 179/170 J |
| 4,389,544 | 6/1983 | Wagner et al. | 179/2 DP |
| 4,476,559 | 10/1984 | Brolin et al. | 370/110.1 |

OTHER PUBLICATIONS

"Telephone Nets Go Digital" by Dorros, IEEE Spectrum, Apr. 1983, pp. 48–53.

Primary Examiner—Douglas W. Olms

[57] ABSTRACT

A telephone which can receive and transmit voice and asynchronous data simultaneously is provided. A signalling circuit provides signals indicating the request for a communication link or requesting a communication link to a predetermined location. A transceiver circuit synchronously receives and transmits frames of digital data bits representing data, voice and signalling information. A voice digitizer circuit converts the received frames of digital bits to an analog output and converts a received voice signal to a digital voice output. An interface circuit is used to interface between an asynchronous data source and the synchronous transceiver circuit. The telephone is line powered by utilizing D.C. isolating transformers to power both voice and data circuitry.

4 Claims, 3 Drawing Figures

SIMULTANEOUS VOICE AND ASYNCHRONOUS DATA TELEPHONE

CROSS REFERENCE TO RELATED APPLICATION

This appplication is related to the following copending application filed simultaneously herewith and assigned to the assignee hereof:

"An Interface Circuit For Interfacing Between Asynchronous Data in Start/Stop Format And Synchronous Data", Ser. No. 06/625,870.

FIELD OF THE INVENTION

This invention relates generally to telephone communication circuits, and more particularly, to a telephone circuit which simultaneously transmits voice and asynchronous data.

BACKGROUND OF THE INVENTION

When communication systems began providing the capability to transmit digital data along with voice information, systems which transmitted either voice or data were implemented. Systems which proclaimed the ability to transmit simultaneously both voice information and data were later developed. Typical methods in which both analog voice and data are transmitted include methods such as voice under data and voice over data. In either method, voice information and data are transmitted at two different frequencies. In voice over data, the voice spectrum is above the data spectrum. Similarly, in data over voice, the data spectrum is over the voice spectrum. In both methods, transmission speed of one type of transmission is sacrificed at the expense of transmission speed of the other type of transmission. Others have used protocols associated with digital telecommunicaton systems in which a data bit is substituted for the least significant voice bit in a technique known as "bit stealing". Such a protocol is taught by Larry Stagg in United Kingdom Pat. No. 2,063,018 for a synchronous data system. However, there still remains a need for a digital telephone which can simultaneously transmit digital voice information with asynchronous data at transmission rates approaching 9600 bits per second.

SUMMARY OF THE INVENTION

Accordingly, an object of the present invention is to provide an improved telephone which can provide simultaneous voice and asynchronous data communication.

Another object of the present invention is to provide an improved digital telephone which provides line powered simultaneous voice and asynchronous data communication via a two wire communication channel.

Yet another object of the present invention is to provide an improved digital telephone which simultaneously communicates voice and asynchronous data bits via a synchronous communication channel at a synchronous bit rate which is less than the asynchronous data bit rate.

In carrying out the above and other objects, there is provided, in one form, a digital telephone having signalling means for providing a first signal indicating the receipt of a communication link request and providing a second signal indicating the request for a communication link to a predetermined destination. Transceiver means are coupled to the signalling means for synchronously receiving frames of digital bits representing data, voice and signalling information. The transceiver means also synchronously transmit frames of digital bits to the predetermined destination. Voice digitizing means are coupled to both the transceiver means and the signalling means. The voice digitizing means convert frames of digital bits received from the transceiver means to an analog output, and convert a sampled voice signal to a digital voice output which is coupled to the transceiver means. Asynchronous data means are coupled to the transceiver means for interfacing between an external asynchronous data source and the synchronous transceiver means. In a preferred form, power supply means are provided to power the telephone from an associated communicaton channel, and isolation means are utilized to provide D.C. isolation between the telephone and the communication channel.

DETAILED DESCRIPTION OF THE PRESENT INVENTION

Figure 1:
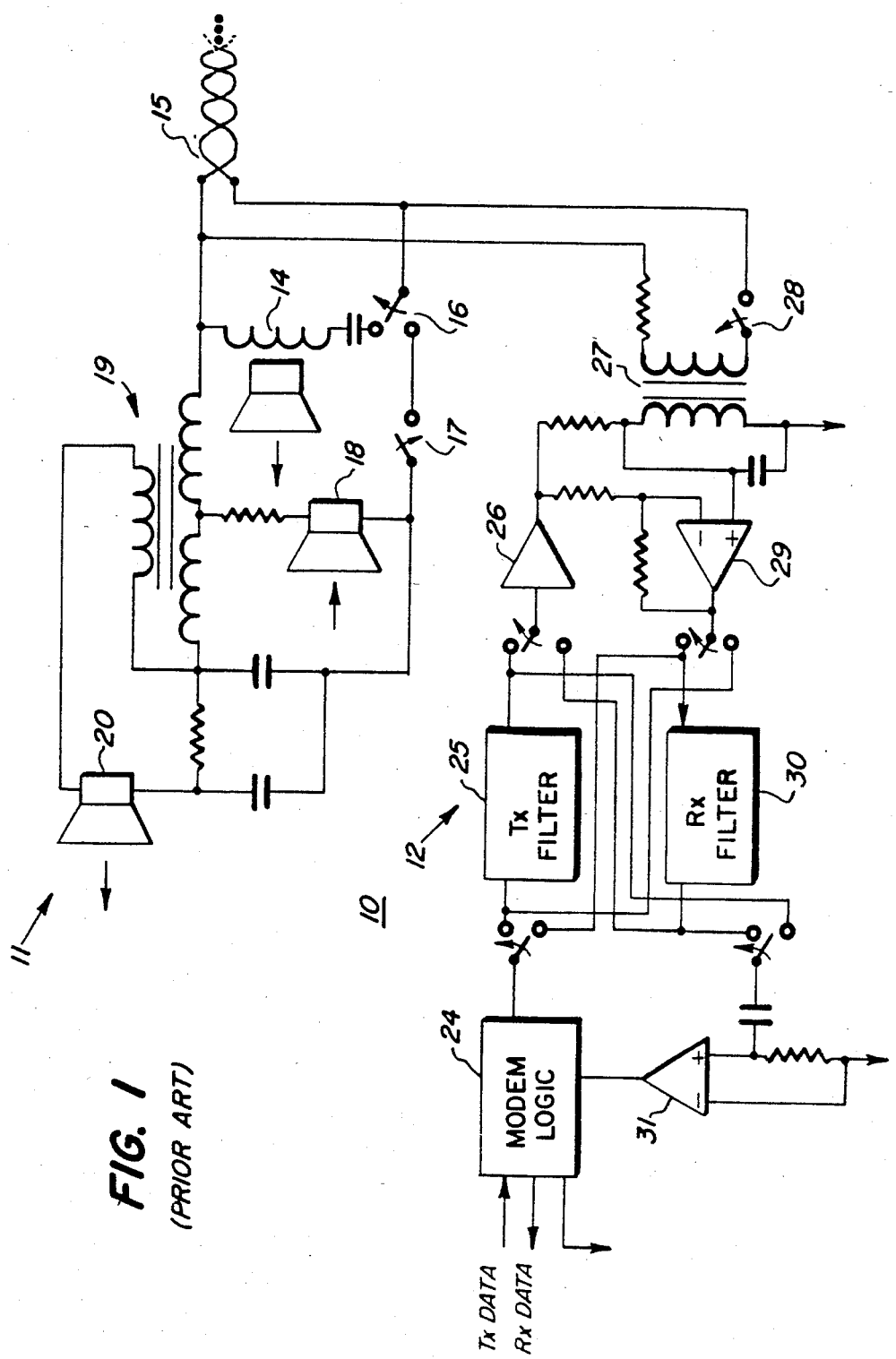
FIG. 1 illustrates in partial schematic form a telephone circuit known in the art for providing voice and data communication.

Shown in FIG. 1 is a telephone 10 known in the art for communicating voice or data. Telephone 10 generally comprises a voice section 11 and a data section 12. Voice section 11 comprises a ringer 14 coupled to a two wire communication link 15. A switch hook 16 is coupled to both communication link 15 and ringer 14 for disabling ringer 14 when a telephone call is received. A dial contact 17 is coupled between switch hook 16 and a carbon microphone 18 for receiving voice information. A side tone network and signal splitter portion 19 couples the input from communciation link 15 to an ear piece 20 where the input is converted to an audible output. An audio input is coupled by signal splitter portion 19 to communication link 15 while predetermined side tone frequencies are coupled to ear piece 20. Side tone network and signal splitter portion 19 controls the amount of trans-hybrid rejection.

Data section 12 is a conventional three hundred baud modem. A modem logic circuit 24 has inputs coupled to an asynchronous data source for transmitting and receiving asynchronous data. A transmit filter 25 is selectively coupled to logic circuit 24 and a first amplifier circuit 26. An output of first amplifier circuit 26 is selectively coupled to communication link 15 via a D.C. isolation transformer 27 by a switch 28. Inputs of a second amplifier circuit 29 are coupled to isolation transformer 27 and the output of first amplifier circuit 26. First and second amplifier circuits 26 and 29 form a hybrid duplexer circuit for selectively coupling data to communication link 15 and coupling received data to a receive filter 30. Received data is selectively coupled to logic circuit 24 via a limiter circuit 31.

In operation, telephone 10 is capable of transmitting either asynchronous data or voice information via communicaton link 15. However, both voice and data are not transmitted at the same time as voice portion 11 and data portion 12 are never simultaneously coupling information to data link 15.

Figure 2A:
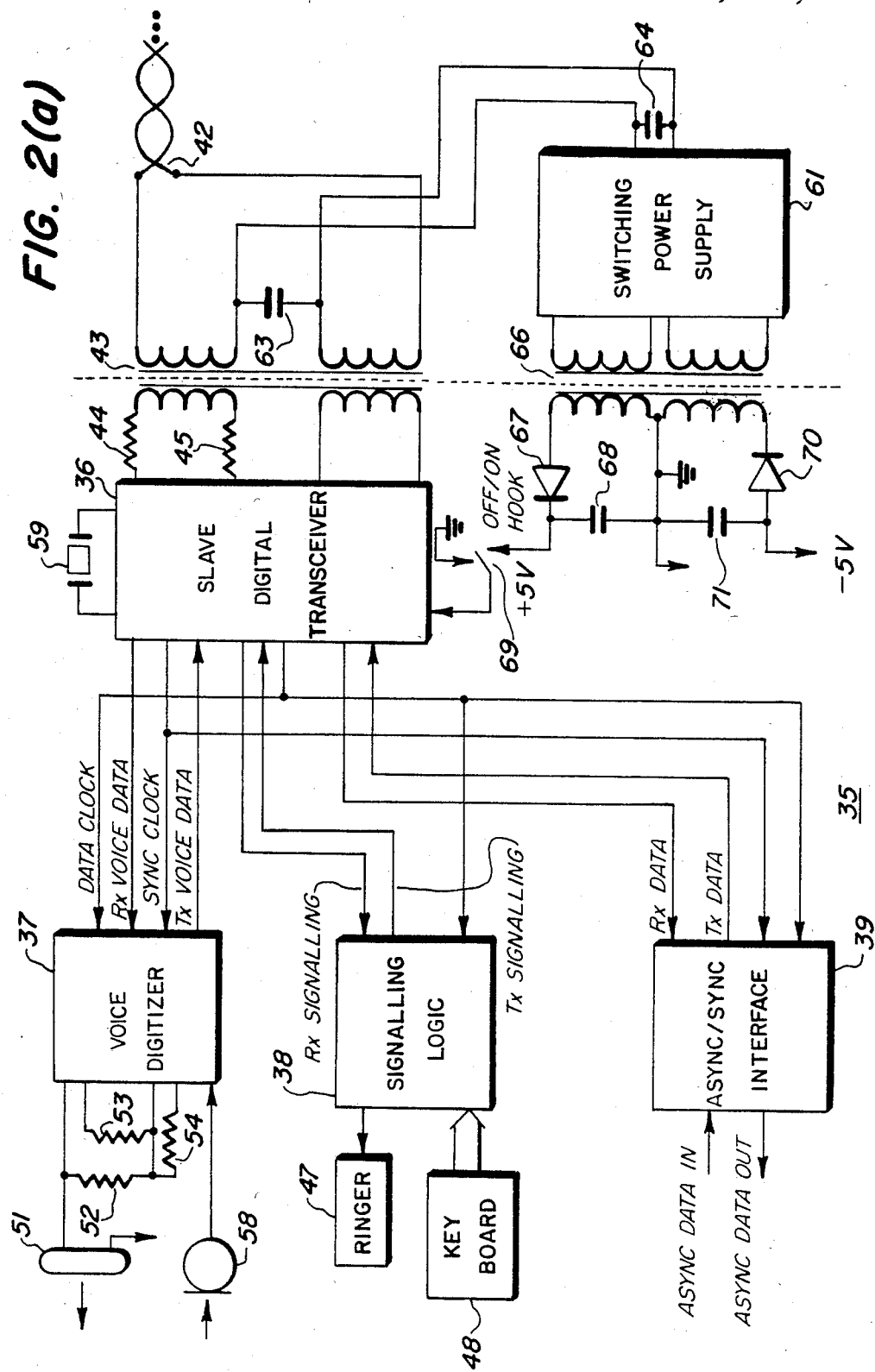
FIGS. 2(a) and 2(b) illustrate in block diagram form when placed adjacent one another a digital telephone in accordance with the present invention coupled to a synchronous private automatic branch exchange.

Shown in FIG. 2(a) is a digital telephone 35 generally comprising a digital transceiver 36, a voice digitizer 37, signalling logic 38 and an asynchronous/synchronous data interface circuit 39. Digital transceiver 36 is coupled to a two wire communication link 42 via a transmit/receive isolation transformer 43. Line impedance matching resistors 44 and 45 are utilized on a first winding of secondary windings of transformer 43. A second winding of the secondary windings of transformer 43 is connected to digital transceiver 36. A receive voice data output of digital transceiver 36 is coupled to a first input of voice digitizer 37. A sync clock output of digital transceiver 36 is coupled to a second input of voice digitizer 37 and to a first input of interface circuit 39. A data clock output of digital transceiver 36 is coupled to a third input of voice digitizer 37, a first input of signalling logic circuit 38, and to a second input of interface circuit 39. A ring enable or receive signalling output of digital transceiver 36 is coupled to a second input of signalling logic circuit 38, and a dial pulse or transmit signalling output of signalling logic circuit 38 is coupled to a first input of digital transceiver 36. A receive data output of digital transceiver 36 is coupled to a third input of interface circuit 39, and a transmit data output of interface circuit 39 is coupled to a second input of digital transceiver 36. A transmit voice data output of voice digitizer 37 is coupled to a third input of digital transceiver 36. Interface circuit 39 has a fourth input for receiving asynchronous input data, and an output for providing asynchronous output data. Signalling logic circuit 38 has a second output coupled to an input of a ringer circuit 47. A key board 48 is coupled to signalling logic circuit 38. An earpiece 51 is coupled to a plurality of voice outputs of digitzer 37 via resistors 52, 53 and 54. A microphone 58 is coupled to a voice input of voice digitizer 37. A crystal 59 has first and second terminals, respectively, coupled to first and second crystal inputs of digital transceiver 36. A switching power supply 61 has first and second inputs coupled to predetermined points of the primary windings of transformer 43. Capacitors 63 and 64 are each coupled across the predetermined points of primary windings of transformer 43. A transformer 66 has the primary windings thereof coupled to switching power supply 61. A first terminal of the secondary windings thereof is coupled to a cathode of a diode 67. An anode of diode 67 is coupled to both a first electrode of a capacitor 68 and a first terminal of an off/on hook switch 69 and provides a positive supply voltage. A second electrode of capacitor 68 is coupled to a grounded center tap of the secondary windings of transformer 66. A second terminal of the secondary windings of transformer 66 is coupled to an anode of a diode 70, and a cathode of diode 69 is coupled to a first electrode of a capacitor 71 for providing a negative supply voltage. A second electrode of capacitor 71 is coupled to the grounded center tap of transformer 66.

Figure 2B:
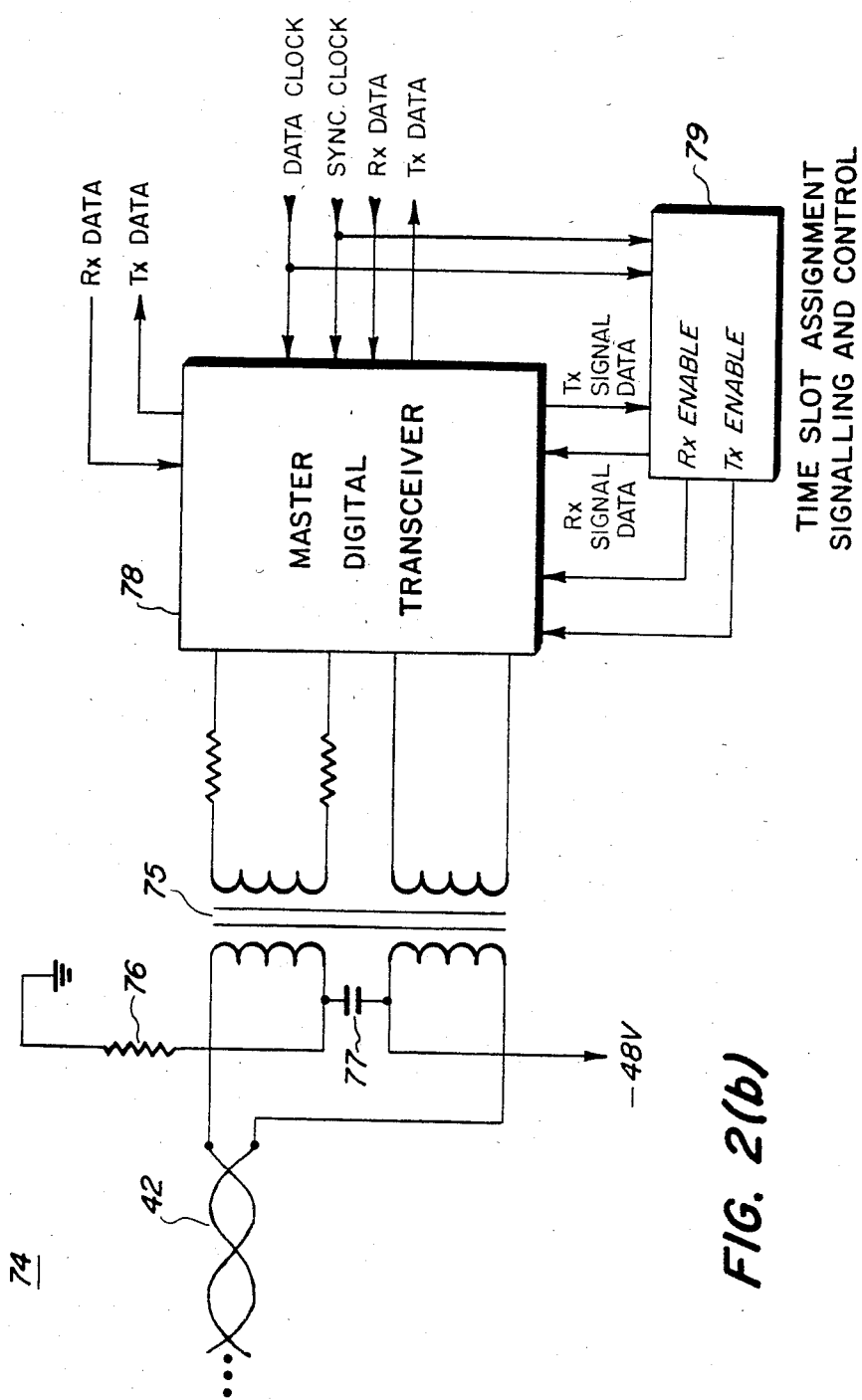

Shown in FIG. 2(b) is a private automatic branch exchange 74 for receiving voice and asynchronous data simultaneously from telephone 10 and for transmitting voice and asynchronous data simultaneously to telephone 10. The two wires of communication link 42 are each coupled to a first terminal of two secondary windings of an isolation transformer 75. A second terminal of the first of the two secondary windings is coupled to a first terminal of a resistor 76 and a first electrode of a capacitor 77. A second terminal of resistor 76 is coupled to a ground potential. A second terminal of the second of the two secondary windings is coupled to a second electrode of capacitor 77 and provides a negative supply voltage. Primary windings of transformer 75 are coupled to a digital transceiver 78. Digital transceiver 78 functions as a master transceiver over transceiver 36 of FIG. 2(a) as described in U.S. Pat. No. 4,432,089, assigned to the assignee hereof and herein incorporated by reference. A time slot assignment signalling and control circuit 79 is coupled to digital transceiver 78 for coordinating the signalling and timing of data receptions and transmissions of digital transceiver 78.

In operation, the present invention functionally comprises digital transceiver 36, voice digitizer 37, signalling logic 38 and interface circuit 39. Digital transceiver 36 may be implemented by using a commercially available MC145426 sold by Motorola, Inc. Voice digitizer 37 may be implemented by one of several commercially available products such as an MC14402 sold by Motorola, Inc. Signalling logic circuit 38 may be implemented by a pulse dialer circuit, a tone ringer circuit or a microprocessor such as an MC146805 sold by Motorola, Inc. Interface circuit 39 may be implemented with the interface circuit taught in the copending application Ser. No. 06/625,870 cross referenced above. Interface circuit 39 may receive asynchronous data in start/stop format from an asynchronous data terminal not shown and synchronously couple the data to transceiver 36.

In the illustrated form, voice may be transmitted simultaneously with asynchronous data via a synchronous two wire communication channel. As discussed in U.S. Pat. No. 4,432,089, transceiver 36 is coupled to communication link 42 via transmit/receive isolation transformer 43 and may communicate with voice digitizer 37, signalling logic 38 and interface circuit 39 via three separate synchronous communication channels. It should be readily apparent that other means of isolation such as optical couplers could be used rather than using isolation transformer 43. In a preferred form, transceiver 36 has one 64K bits/second channel and two 8K bits/second channels. In one form, the 64K bits/second channel may be utilized as a voice channel, the 8K bits/second channel may be utilized as a data channel, and the other 8K bits/second channel may be utilized as a signalling channel. As a result, transceiver 36 provides an 80K bits/second synchronous full duplex communication link. In such an application, the 64K bits/second voice channel is coupled from transceiver 36 to voice digitizer 37, the 8K bits/second signalling channel is coupled from transceiver 36 to signalling logic 38, and the 8K bits/second data channel is coupled from transceiver 36 to interface circuit 39 as shown in FIG. 2(a).

In the illustrated form, telephone 35 is line powered from the private automatic branch exchange 74. D.C. isolation of the voice and data channel from communication link 42 is accomplished by use of isolation transformer 43, and line powering of the data channel is accomplished by use of isolation transformer 66. Switching power supply 61 is utilized to provide power to transceiver 36, to voice digitizer 37, to signalling logic 38 and to interface circuit 39 via off/on hook switch 69. If interface circuit 39 and transceiver 36 were not isolated from communication link 42, the entire communication link 42 could be short circuited. This is because at the automatic branch exchange end of communication link 42, one of the two wires of the link is coupled to a ground potential via resistor 76. Asynchronous data which is coupled to interface circuit 39 originates from a source such as an asynchronous data terminal which may also use a ground potential at its output when no data is being transferred. If D.C. isolation did not exist between telephone 35 and branch exchange 74, a ground potential could exist at both locations and no data would ever be transmitted. The use of two D.C. isolating transformers insures that neither voice nor data sources will be short circuited.

In other forms of the invention, the three illustrated channels of transceiver 36 may be coupled to digitzer 37, signalling logic 38 and interface circuit 39 in various ways. Instead of interfacing to an 8K bits/second channel, interface circuit 39 could be switched between an 8K bits/second channel or a 64K bits/second channel. In this configuration, up to 56K bits/second asynchronous data from another telephone could be received or transmitted. In yet another form, signalling logic 38 and interface circuit 39 may have the outputs thereof coupled to share both 8K bits/second channels which effectively creates a 16K bits/second channel. Because the signalling channel rate is usually slow, typically only one or two bits of signalling information are transmitted every second. Therefore, virtually all of the 16K bits/second channel may be used for synchronous data transmission. As a result, telephone 35 may communicate approximately 19.2K bits/second asynchronous data while simultaneously transmitting 64K bits/second voice information.

The present invention may be utilized to provide a telephone which is capable of very fast and efficient simultaneous data and voice transmission. Because asynchronous data has associated overhead such as start and stop bits stripped by interface circuit 39, an 8K bits/second synchronous data channel can be used to transmit all the data provided by an asynchronous data terminal with a port such as an RS232 port at 9600 bits/second. If extremely fast data transmission is desired, the 64K bits/second channel of transceiver 36 may be used for data rather than voice. In such an embodiment of the present invention, voice may be transmitted simultaneously by using one of the 8K bits/second channels of transceiver 36. By now it should be apparent that a telephone which provides simultaneous voice, signalling and 9600 bits/second asynchronous data transmission through a digital private automatic branch exchange via a single twisted pair of conductors is herein provided.

We claim:

1. A digital telephone for providing simultaneous voice and asynchronous data communication via a two conductor communication channel, comprising:

signalling means for providing a first signal indicating the receipt of a communication link request and a second signal indicating a request for a communication link to a predetermined destination;

transceiver means coupled to both the two conductor communication channel and the signalling means, for synchronously receiving from the two conductor communication channel frames of digital bits, predetermined ones of which each contain data, voice and signalling information, and synchronously tansmitting frames of digital bits from the telephone to the predetermined destination via the two conductor communication channel;

voice digitizing means coupled to both the transceiver means and the signalling means, for converting the voice information portion of the received frames of digital bits to an analog output, and for receiving and converting an analog voice signal to a digital voice output which is coupled to the transceiver means for transmission;

asynchronous data inteface means coupled to the transceiver means, for receiving a receive portion of digital data from the transceiver means and providing the receive portion of data in asynchronous form at an output, and for asynchronously receiving a transmit portion of digital data and providing the transmit portion of data to the transceiver means while maintaining synchronization with the transceiver means;

switching power supply means having an input coupled to the two conductor communication channel, and an output, for converting D.C. power received from the two conductor communication channel to a regulated D.C. voltage for line powering the telephone set;

first isolation means coupled to the output of the switching power supply means, for converting D.C. power received from the communication channel to an isolated, regulated D.C. voltage for line powering the telephone set; and second isolation means coupled between the transceiver means and the two conductor communication channel, for electrically isolating D.C. voltage potentials which may be coupled to the communication channel at both the telephone set and a remote location.

2. The digital telephone set of claim 1 wherein the transceivers means is coupled to the voice digitizing means via a 64 K bits/second communication channel, said transceiver means is coupled to the signalling means via an 8 k bits/second communication channel, and said transceiver means is coupled to the asynchronous data interface means via a second 8 K bits/second communication channel.

3. A simultaneous voice and asynchronous data telephone, comprising:

synchronous transceiver means coupled to a synchronous communication channel, for synchronously receiving frames of digital bits, each frame containing data, voice and signalling information, and synchronously transmitting frames of the bits to a predetermined destination;

signalling means coupled to the transceiver means via a first channel means, for receiving a ring signal indicating the receipt of a communication link request, and for coupling a call signal to the transceiver means indicating the request for a communication link with the predetermined destination;

voice digitizing means coupled to the transceiver means via a second channel means, for converting the voice information portion of the received frames of digital bits to an analog output, and for receiving and converting an analog voice signal to a digital voice output;

data interface means coupled to the transceiver means via a third channel means, for asynchronously receiving data in start/stop format and providing the data to the transceiver means while maintaining synchronization, and for receiving data from the transceiver means and asynchronously providing the data at an output, wherein the second channel operates at a higher communication rate than the first and third channels;

switching power supply means having an input coupled to the synchronous communication channel, and an output, for converting D.C. power received from the synchronous communication channel to a regulated D.C. voltage for line powering the telephone;

first isolation means coupled to the output of the switching power supply means, for converting D.C. power received from the communication channel to an isolated, regulated D.C. voltage for line powering the telephone; and second isolation means coupled between the transceiver means and the communication channel, for electrically isolating substantially equal D.C. voltage potentials which may be coupled to the communication channel at both the telephone set and a remote location.

4. The telephone of claim 3 wherein the second channel operates a substantially 64K bits/second and the first and third channels each operate at substantially 8K bits/second.

* * * * *

UNITED STATES PATENT AND TRADEMARK OFFICE
CERTIFICATE OF CORRECTION

PATENT NO. : 4,593,389

DATED : June 3, 1986

INVENTOR(S) : Henry Wurzburg et al

It is certified that error appears in the above-identified patent and that said Letters Patent is hereby corrected as shown below:

Title page:

After Item /76/ insert as follows:

-- /73/      Assignee: Motorola, Inc.
                             Schuamburg, Ill.--.

Signed and Sealed this

Twenty-fourth Day of February, 1987

Attest:

DONALD J. QUIGG

*Attesting Officer*          *Commissioner of Patents and Trademarks*